Jan. 22, 1929.
M. KRUEGER
1,700,063
SAFETY DEVICE FOR GAS COCKS
Filed April 14, 1928
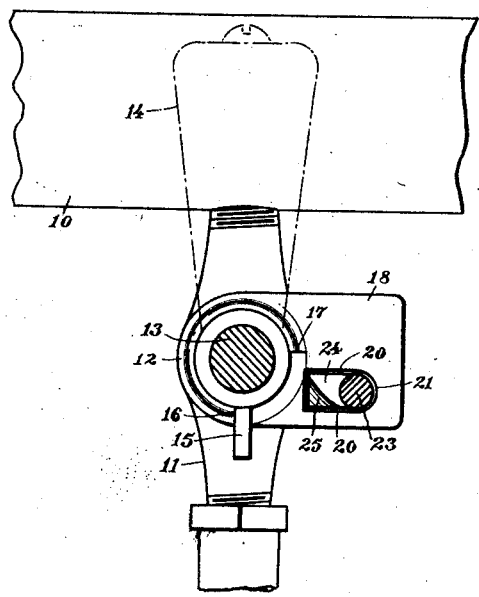
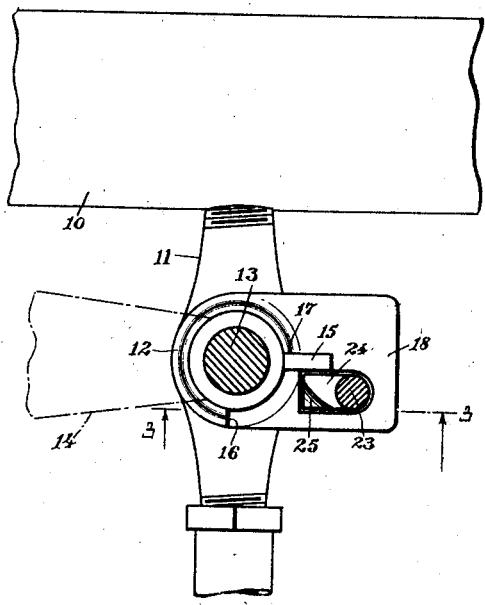
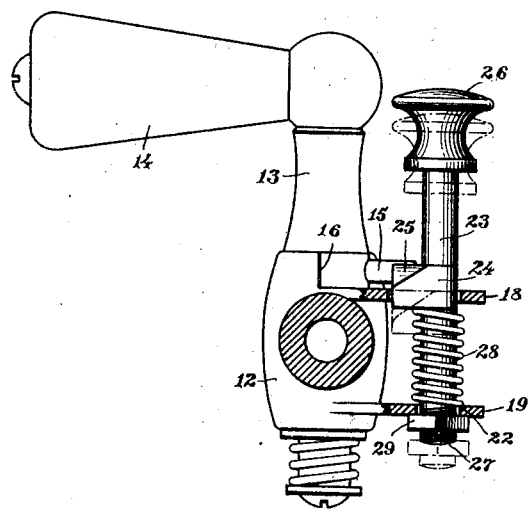
INVENTOR
Max Krueger
BY
ATTORNEY Patented Jan. 22, 1929.

1,700,063

UNITED STATES PATENT OFFICE.

MAX KRUEGER, OF BROOKLYN, NEW YORK.

SAFETY DEVICE FOR GAS COCKS.

Application filed April 14, 1928. Serial No. 270,008.

This invention relates to a safety device for gas cocks and closely analogous articles.

More particularly the invention relates to a safety device for a gas cock, which is automatically operable to keep the cock closed to prevent unintentional flow of gas, and which may be readily operated to allow the cock to be opened to permit intentional flow of gas.

The principal object of the invention is the provision of a device of the indicated character, which will be of extremely simple construction, easy to associate with a gas cock, and one which will be reliable and positive in action.

The nature of the invention and its distinguishing features and advantages will appear when the following specification is read in connection with the accompanying drawing, in which—

Figure 1, is a view of a portion of a gas feed pipe with a well known type of cock connected with the pipe, and the device of the present invention associated with the cock, said cock and the device being shown in sectional plan, the handle of the cock being shown in dot and dash lines, the cock being opened.

Figure 2, is a view similar to Fig. 1, but the cock is shown closed.

Figure 3, is a sectional side elevation, the section being taken on the line 3—3, of Fig. 2.

Referring now more particularly to the drawings, it will be apparent that there has been shown a portion of a gas feed pipe 10 and a gas cock 11 connected therewith which serves to control the flow of gas from the pipe 10. The cock 11 includes a body 12 having the usual inlet and outlet, and a valve member 13 operatively associated with the body 12 to control the inlet and outlet to control the flow of gas through the outlet. The valve member 13 has a handle 14 for operating the valve member. The valve member 12 has a pin or lug 15 which is positioned to encounter stops 16 and 17 on the body 12 to limit the movement of the valve member 13 to the opened and closed positions.

In order to prevent the unintentional movement of the valve member 13 from the closed position there is provided a device presently to be described. On the body 12 there are two guide lugs; a lug 18 and a lug 19. The lug 18 has an opening which presents opposing walls 20 and a rounded wall 21. The lug 19 has a round hole 22. An element 23 is employed in conjunction with the lugs 18 and 19 and is guided for up and down movements with respect thereto. The element 23 has fixedly connected, or integrally formed therewith a keeper 24 having a cam 25. The upper end of the element 23 has a knob 26, and the lower end of said element is threaded as at 27. The keeper 24 conforms in shape to the shape of the opening in the lug 18. The keeper 24 is positioned on the element 23 intermediate its ends. The element 23 is adapted to be extended in the opening and hole respectively in the lugs 18 and 19. A spring 28 surrounds a portion of the element 23, one end of the spring 28 being in contact with the keeper 24, and the opposite end of the spring being in contact with the lug 19. A nut 29 is threaded on the end 27 of the element 23. The arrangement is such that the keeper 24 will be disposed in the opening in the lug 18, and will prevent the element 23 from turning, by coaction with the walls 20, but will be allowed to move up under the action of spring 28, and down either by pushing downwardly on the knob 26, or by the pressure of the lug 15 on the cam 25 of the keeper 24. When the valve member 13 is in the closed position, the lug 15 encounters the keeper 24 and thus prevent unintentional movement of the valve member from the closed position.

From the foregoing it will be apparent, that when it is desired to open the cock, the element 23 is moved downwardly by exerting pressure on the knob 26, until the upper surface of the keeper 24 is below the lug 15. The valve member 13 may then be turned to the opened position by manipulating the handle 14. When the lug 15 has cleared the keeper 24, the spring 28 will return the element 23 to its normal position, the element 23 moving upwardly but being limited in its upward movement by the nut 29, which comes in contact with the lug 19. In closing the cock 11, the handle 14 is manipulated to turn the valve member 13, and there comes a time when the lug 15 encounters the cam 25, and imparts pressure thereon, causing the element 23 to move downwardly until the lug 15 clears the upper surface of the keeper 24. This is followed immediately by upward movement of the element 23 under the influence of the spring 28, bringing the keeper 24 in a position to obstruct the lug 15, and thus preventing unintentional movement of valve member 13 from the closed position.

I claim:

The combination with a cock or analogous device having a body, and a valve member turnable in said body to opened and closed positions, said valve member having a fixed lateral member; of spaced lugs fixed on said body, an element extending through and guided for rectilineal movement by said spaced lugs, said element having a manipulating knob at one end and a removable nut on the opposite end, a keeper having a cam surface fixed on said element, said keeper adapted to coact with one of said lugs to prevent turning movement of said element, yieldable means which moves said element in one direction to bring said keeper to a position to obstruct said lateral member to prevent turning of the valve member from the closed to the opened position, said lateral member riding on said cam surface to impart movement to said element against the action of the yieldable means to bring the keeper to a position so that the lateral member may pass the keeper in the movement of the valve member from the opened to the closed position, followed by the action of the yieldable means which returns said element to its normal position and the keeper in the obstructing position, said element being movable by exerting pressure on said knob to a position to bring the keeper to a non-obstructing position with respect to the lateral member, so that the valve member may be moved from the closed to the opened position.

Signed at New York in the county of New York and State of New York this 12th day of April, A. D. 1928.

MAX KRUEGER.